No. 617,206. Patented Jan. 3, 1899.
J. TVEIT & O. OVERSEN.
TOOL HANDLE.
(Application filed June 4, 1898.)
(No Model.)
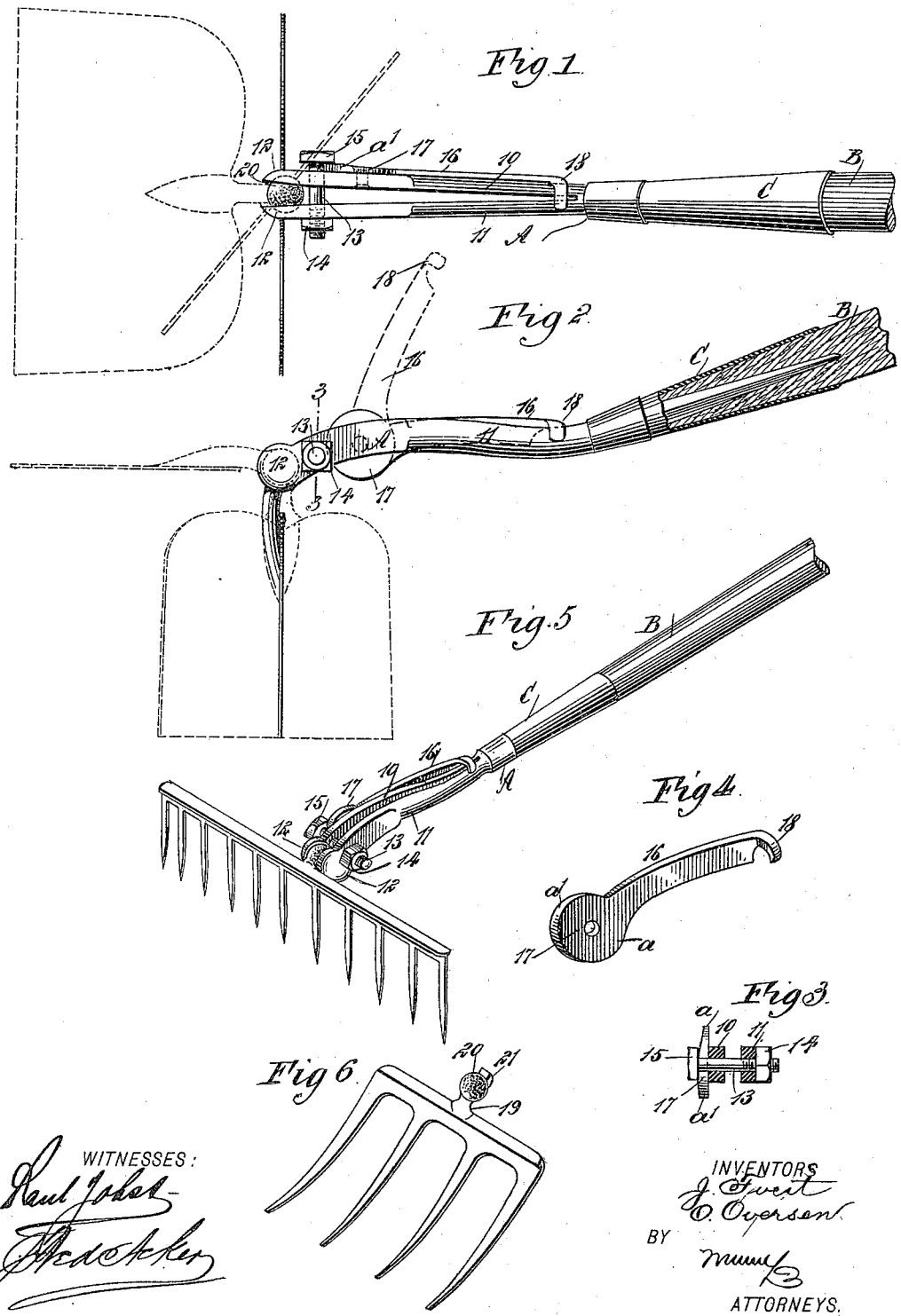

UNITED STATES PATENT OFFICE.

JACOB TVEIT, OF STODDARD, AND OLE OVERSEN, OF LA CROSSE, WISCONSIN.

TOOL-HANDLE.

SPECIFICATION forming part of Letters Patent No. 617,206, dated January 3, 1899.

Application filed June 4, 1898. Serial No. 682,602. (No model.)

*To all whom it may concern:*

Be it known that we, JACOB TVEIT, of Stoddard, in the county of Vernon, and OLE OVERSEN, of La Crosse, in the county of La Crosse, State of Wisconsin, have invented a new and useful Improvement in Agricultural Tools and Handles Therefor, of which the following is a full, clear, and exact description.

The object of the invention is to provide a handle for such tools as hoes, rakes, and forks and to so fit the tools to the handles that any tool may be securely yet removably held by the handle and whereby the tools can be adjusted either vertically or laterally, as required.

The invention consists in the novel construction and combination of the several parts, as will be hereinafter fully set forth, and pointed out in the claims.

Reference is to be had to the accompanying drawings, forming a part of this specification, in which similar characters of reference indicate corresponding parts in all the views.

Figure 1 is a plan view of a portion of the handle, illustrating the application of the handle to a hoe and likewise illustrating the hoe in different positions. Fig. 2 is a side elevation of the handle and hoe shown in Fig. 1. Fig. 3 is a vertical section taken substantially on the line 3 3 of Fig. 2. Fig. 4 is a detail perspective view of a lock-lever used in connection with the handle. Fig. 5 is a perspective view of a portion of the handle and a rake applied thereto, and Fig. 6 is a perspective view of a fork adapted for application to the handle.

The handle B is connected with a shank A, preferably through the medium of a ferrule C; but the shank and the handle proper may be connected in any other desired manner.
The shank A is made of a spring material and is longitudinally and centrally slotted, whereby two opposing members 10 and 11 are obtained. The inner faces of these members are ordinarily flat, as are likewise their outer faces near the forward ends of said members, and each member is made to terminate at its forward end in a cup-shaped head 12, the heads forming opposing sockets. A bolt 13 is passed through the members of the shank back of the heads 12, and the said bolt is provided at one end with a nut 14 and at the opposite end with a head 15.

A lock-lever 16 is used in connection with the shank of the handle. This lock-lever consists of a head portion 17, having a thin edge $a$, the material being gradually increased to form an opposing thick edge or surface $a'$, as shown best in Fig. 4. At the opposite end of the lever 16 a projection 18 is made, adapted when the lever is in locking position to engage with the shank A, as shown in Fig. 5. The lever is pivoted at the central portion of its head to the outer face of the member of the shank, adjacent to which the head 15 of the bolt 13 is located, and the head of the lever is adapted to have movement between the head of the bolt 13 and the opposing surface of the shank.

The hoe, rake, fork, or other tool that is to be attached to the shank is provided with a ball 20, connected with the tool by a neck 19, and the said ball has preferably a roughened exterior surface. The ball is adapted to be received within the sockets formed by the cupped heads 12 of the shank. The tool having been thus received by the shank, the nut 14 is screwed up until the heads 12 tightly clamp the ball; but the heads may be made to more securely bind the ball by manipulating the lever 16 to bring its thicker edge $a'$ between the head of the bolt 13 and the shank. Before the tool is connected with the shank the lever is raised, as shown in dotted lines in Fig. 2, bringing the thinner edge $a$ of the lever-head between the head of the bolt and the shank. When the lever is raised, the tool connected with the shank may be placed at a right angle to the shank, diagonally thereof, or in longitudinal alinement with the shank, as shown in Figs. 1 and 2.

When a hoe is employed in connection with the shank, by placing the blade of the hoe at an angle to the handle about the same as an ordinary hoe-blade a common hoe is obtained, as shown in positive lines in Fig. 1. The angle at which the hoe is located, however, may be changed, so that no matter how tall or how short the workman may be said workman can always stand erect while performing his work. Furthermore, the hoe can be placed diagonally, as shown in dotted lines in Fig. 1, and such position of the hoe will be found exceedingly useful for hilling up the ground around tobacco-plants or other plants having wide leaves near the ground. By placing the blade of the hoe lengthwise on the handle a light ax is obtained, which will be found exceedingly useful for cutting out tobacco and corn. By placing the blade so that it stands straight out from the handle a light spade is obtained.

When a potato or dung fork is to be applied to the handle, the ball 20 is provided with a lug 21, which lug in the adjusted position of the fork will engage with the bolt 13 at a point between the members of the shank.

The detachable connection of a rake-head with the clamping-limbs 10 11 (shown in Fig. 5) is effected in the same manner as is the blade of the hoe, and thus provides a useful additional tool for service as occasion may require.

Having thus described our invention, we claim as new and desire to secure by Letters Patent—

1. In a handle for tools, a bifurcated shank, the members whereof are provided with opposing socket-faces adapted to receive between them a ball connected with a tool, a bolt passing loosely through the members of the shank and provided with a head at one end and a nut at the opposite end, and a lever pivoted on the said shank at the rear of the bolt and formed with a head having an edge gradually increasing in thickness, the said head engaging the side of the shank and the head of the bolt and having a wedge action, for the purpose specified.

2. A tool-handle provided with a bifurcated shank having opposing socket-faces, a bolt loosely passed through the members of the shank at the rear of the said socket-faces, the bolt being provided with a head at one end and a nut at the opposite end, and a lever pivoted on the said shank, at the rear of the bolt and provided with a cam-head which enters the space between the head of the bolt and the opposing surface of the shank, for the purpose set forth.

3. The combination with a tool provided with a ball, of a shank adapted for connection with a handle and formed of spring material, the said shank being longitudinally slotted forming two opposing members, each of said members terminating at its forward end in a cup-shaped head, the said heads forming opposing socket-faces adapted to receive the ball of the tool, a tension device for the said members of the shank, comprising a bolt passed through the said members at the rear of the socket-faces and having a nut at one end and a lock-lever pivoted on the outer side of one of the members of the shank at the rear of said tension device and provided with a head having a wedge-shaped edge, the free end of the said lever being provided with a projection extending at an angle thereto and adapted when the lever is in locking position to engage with the said shank, substantially as set forth.

JACOB TVEIT.
OLE OVERSEN.

Witnesses:
OLUF G. MOEN,
O. R. SKAAR.